United States Patent [19]

Morinaga

[11] 4,337,320

[45] Jun. 29, 1982

[54] EXPANDABLE VINYL CHLORIDE RESIN COMPOSITION

[75] Inventor: Misao Morinaga, Buzen, Japan

[73] Assignee: Otsuka Chemical Co., Ltd., Osaka, Japan

[21] Appl. No.: 247,397

[22] Filed: Mar. 25, 1981

[51] Int. Cl.³ .................. C08G 18/14; C08G 18/62; C08G 18/58

[52] U.S. Cl. .................................. 521/137; 264/41; 264/176 R; 264/331.11; 264/331.12; 264/DIG. 3; 264/DIG. 42; 264/DIG. 62; 264/DIG. 77; 521/95; 521/128; 521/134; 521/135

[58] Field of Search .................. 521/137, 134, 135

[56] References Cited

U.S. PATENT DOCUMENTS 3,868,431  2/1975  Hutchinson .................. 521/137

FOREIGN PATENT DOCUMENTS 2088043  1/1972  France .................. 521/137

OTHER PUBLICATIONS

Japanese Patent Unexamined Publication No. 18665/1978 (Mitsubishi Monsanto).

Primary Examiner—H. S. Cockeram
Attorney, Agent, or Firm—Armstrong, Nikaido, Marmelstein & Kubovcik

[57] ABSTRACT

An expandable vinyl chloride resin composition for foaming under atmospheric pressure which comprises a resin ingredient comprising (A) a vinyl chloride homopolymer or copolymer having substantially no active hydrogens, (B) a vinyl chloride copolymer having active hydrogens and (C) a thermoplastic polyurethane resin, and a crosslinking agent, a foaming agent, a thermal stabilizer and a plasticizer, the ratio of the components (A), (B) and (C) being 30 to 90:5 to 40:5 to 40 by weight. The composition is expanded under atmospheric pressure to give a foam of a high expansion ratio which has uniform and fine cells and shows an excellent rubber-like elasticity.

5 Claims, No Drawings

EXPANDABLE VINYL CHLORIDE RESIN COMPOSITION

BACKGROUND OF THE INVENTION

The present invention relates to a novel expandable vinyl chloride resin composition for foaming under atmospheric pressure. More particularly, it relates to a vinyl chloride resin composition capable of giving a foam of a high expansion ratio and having an excellent rubber-like elasticity by forming under atmospheric pressure.

Usually vinyl cloride resin foams have been prepared by an atmospheric pressure foaming process or a pressure foaming process.

The atmospheric pressure foaming process usually consists of the steps of forming an expandable vinyl chloride resin composition into a preform such as sheet at a temperature of less than the decomposition temperature of the foaming agent employed and heating the preform under an atmospheric pressure at a temperature of not less than the decomposition temperature of the foaming agent to expand the preform by means of the gas generated by the decomposition of the foaming agent. The pressure foaming process usually consists of the first foaming step wherein an expandable vinyl chloride resin composition is heated and melted under an elevated pressure at a temperature of not less than the decomposition temperature of the foaming agent so that the gas generated by the decomposition of the foaming agent is dispersed finely into the molten composition, and the second foaming step wherein the foamed composition is finally expanded under an atmospheric pressure.

According to the atmospheric pressure foaming process, vinyl chloride resin foams can be produced by continuous foaming employing a calender or an extruder. However, the process involves such a technical difficulty that when a foam of a high expansion ratio, i.e. a low specific gravity is tried to be obtained from an expandable composition employing a usual vinyl chloride homopolymer or copolymer, the cells of the foam become coarse ununiformly and disintegrated, resulting in failure in obtaining a desirable foam. Therefore, the fact is that only foams of lower expansion ratios of upmost 5 to 6 can be obtained. Moreover, a thicker foam (for instance, 10 mm. in thickness) obtained by the atmospheric pressure foaming process has a drawback that when the foam is subjected to compression, a strain remains in the foam and the cushiony property of the foam is not comparable with that of polyurethane foam or polyolefin foam.

On the other hand, according to the pressure foaming process, vinyl chloride resin foams of high expansion ratios, for instance, having a specific gravity of 0.03 to 0.04 g./cm.$^3$ can be readily obtained. However, the process is poor in productivity since the foaming in the process is carried out by batch process. Therefore, if possible, it is desirable to produce vinyl chloride resin foams of high expansion ratios by the atmospheric pressure foaming process.

For the purpose of settling the above-mentioned problems of the atmospheric pressure foaming process, there has been proposed an expandable vinyl chloride resin composition composed of a vinyl chloride copolymer having active hydrogens such as a copolymer having hydroxyl groups or carboxyl groups, as a main resin ingredient and a crosslinking agent, a foaming agent and a plasticizer. However, the composition has a drawback that the foaming of the composition requires a precise foaming condition. That is, the reaction of the vinyl chloride copolymer having the active hydrogens, i.e. the hydrogen of the hydroxyl or carboxyl group with the crosslinking agent proceeds rapidly at a temperature in the vicinity of the decomposition temperature of the foaming agent, whereby the melt viscosity of the composition during the formation of cells is influenced significantly. As a result, if the foaming takes place ahead the crosslinking, the resulting cells become coarse, while if the crosslinking takes place ahead the foaming, the foaming is hindered. Therefore, it is very difficult to obtain a highly expanded foam having uniform, fine cells from the above-mentioned composition.

OBJECTS OF THE INVENTION

An object of the present invention is to provide a novel expandable vinyl chloride resin composition which is capable of giving a vinyl chloride resin foam of a high expansion ratio and having an excellent rubber-like elasticity by foaming under atmospheric pressure.

This and other objects of the present invention will become apparent from the description hereinafter.

DETAILED DESCRIPTION

It has been found out that the above objects can be accomplished by an expandable vinyl chloride resin composition for foaming under atmospheric pressure which comprises a resin ingredient comprising (A) a vinyl chloride homopolymer or copolymer having substantially no active hydrogens, (B) a vinyl chloride copolymer having active hydrogens and (C) a thermoplastic polyurethane resin, and a crosslinking agent, a foaming agent, a thermal stabilizer and a plasticizer, the ratio of the components (A), (B) and (C) being 30 to 90:5 to 40:5 to 40 by weight.

The expandable vinyl chloride resin composition of the present invention is characterized by employing as a resin ingredient the above-mentioned specific resin mixture of the components (A), (B) and (C). When the composition of the present invention is expanded by an atmospheric pressure foaming process, there is readily obtained a highly expanded foam having an excellent rubber-like elasticity with uniform and fine cells, with completely eliminating the problems encountered with the conventional expandable vinyl chloride resin compositions, i.e. the problem that only a low expanded foam of a poor quality is obtained due to the formation of ununiform and coarse cells and the disintegration of the cells in the case of the expandable composition employing as a resin ingredient only a usual vinyl chloride homopolymer or copolymer having no active hydrogens and the problem that there is required a precise control of foaming condition in the case of the expandable composition employing as a main resin ingredient a vinyl chloride copolymer having active hydrogens.

Examples of the component (A) employed in the present invention, i.e. the vinyl chloride homopolymer or copolymer having substantially no active hydrogens include any usual vinyl chloride homopolymer and copolymers obtained by polymerizing vinyl chloride alone or in combination with one or more ethylenically unsaturated compounds having no active hydrogen according to usual polymerization processes including suspension polymerization and emulsion polymerization. Typical examples of the vinyl chloride copolymer are copolymers of vinyl chloride and a vinyl ester such as vinyl acetate, vinyl propionate or vinyl stearate, copolymers of vinyl chloride and an olefin such as ethylene, propylene or butylene, copolymers of vinyl chloride and styrene or its derivatives, and copolymers of vinyl chloride and a vinyl ether such as vinyl stearyl ether, vinyl methyl ether or vinyl ethyl ether. The vinyl chloride homopolymer or copolymer has preferably an average degree of polymerization of 300 to 3,000. From a viewpoint of operation property, an average degree of polymerization of 700 to 1,900 is more preferable.

Examples of the component (B) employed in the present invention, i.e. the vinyl chloride copolymer having active hydrogens include those obtained by copolymerizing vinyl chloride with one or more monomers having an active hydrogen such as monomers having hydroxyl group or carboxyl group according to usual polymerization processes including suspension polymerization, emulsion polymerization, bulk polymerization and solution polymerization. Typical examples of those vinyl chloride copolymers are copolymers of vinyl chloride and one or more monomers such as 2-hydroxyethyl acrylate, 2-hydroxyethyl methacrylate, 2-hydroxypropyl acrylate, 2-hydroxypropyl methacrylate, 3-chloro-2-hydroxypropyl methacrylate, 3-hydroxybutyl acrylate, ethyl 2-hydroxyethyl fumarate, 3-hydroxybutyl vinyl ether, acrylic acid, methacrylic acid, monobutyl maleate and undecylenic acid.

The vinyl chloride copolymer having active hydrogens preferably contains 0.3 to 20% by mole, particularly 0.5 to 10% by mole of the monomer unit having an active hydrogen, i.e. monomer unit having a functional group such as hydroxyl group or carboxyl group. When the content of the active hydrogen containing monomer unit in the vinyl chloride copolymer having active hydrogens falls under the above range, the melt viscosity of the resulting expandable composition during the formation of cells is hardly influenced by the crosslinking of the vinyl chloride copolymer having active hydrogens, resulting in the formation of a highly expanded foam having an excellent rubber-like elasticity. If the content of the active hydrogen containing monomer unit is more than 20% by mole, the inherent excellent properties of polyvinyl cholide resin are apt to be lost. If the content of the active hydrogen containing monomer unit is less than 0.3% by mole, the degree of crosslinking is insufficient so that it is difficult to obtain a highly expanded vinyl chloride resin foam having uniform cells and a rubber-like elasticity.

The vinyl chloride copolymer having active hydrogens employed in the present invention also includes vinyl chloride copolymers obtained by introducing functional groups having an active hydrogen into the above-mentioned vinyl chloride copolymer having substantially no active hydrogens by chemical treatment. Such a chemical treatment includes the hydrolysis of a copolymer of vinyl chloride and a vinyl ester, the hydrolysis of a copolymer of vinyl chloride and an acrylic acid ester, the ring opening of the epoxy group of a copolymer of vinyl chloride and a vinyl monomer having an epoxy group by acid treatment and the hydrolysis of a copolymer of vinyl chloride and N-(alkoxymethyl)acrylamide.

In the present invention, the vinyl chloride copolymer having active hydrogens may be formed in situ in the preparation of the expandable composition of the present invention. For instance, when the above-mentioned copolymer of vinyl chloride and N-(alkoxymethyl)acrylamide is employed as a starting material, the coplymer is subjected to mechanochemical reaction in the blending and forming of the resulting composition to give a vinyl chloride copolymer having hydroxyl groups.

The vinyl chloride copolymer having active hydrogens employed in the present invention preferably has an average degree of polymerization of 300 to 3,000, particularly 700 to 1,900. When the average degree of polymerization is more than 3,000, the vinyl chloride copolymer having active hydrogens shows a poor compatibility to the other resin components and it is therefore required a high temperature or a long period of time in blending the resulting composition, which results in the induction of the undesirable decomposition of a foaming agent before the foaming step. When the average degree of polymerization is less than 300, it is difficult to obtain a foam having a high expansion ratio and an excellent rubber-like elasticity.

The thermoplastic polyurethane resin employed as the component (C) in the present invention is usually a linear polyurethane having active hydrogens. Examples of the thermoplastic polyurethane resin include polyurethanes having hydroxyl groups at the terminal ends of their molecules and capable of reacting with the crosslinking agent mentioned below. Such polyurethanes can be obtained by reacting a difunctional polyol with a diisocyanate in such a condition that the following relationship is satisfied:

$$[NCO]/[OH] < 1$$

wherein [NCO] is the total number of moles of the isocyanate group contained in the diisocyanate employed and [OH] is the total number of moles of the hydroxyl group contained in the difunctional polyol employed. The thermoplastic polyurethane resin preferably has an average molecular weight of 3,000 to 300,000, particularly 10,000 to 100,000 and a Vicat softening point of not more than 170° C. A thermoplastic polyurethane resin having an average molecular weight of more than 300,000 and a Vicat softening point of more than 170° C. shows a poor compatibility to the vinyl chloride resins as the components (A) and (B). When the average molecular weight is less than 3,000, it is difficult to obtain a foam having a sufficient rubber-like elasticity.

The resin ingredient employed in the composition of the present invention is a mixture of the component (A), i.e. the usual vinyl chloride homopolymer or copolymer having substantially no active hydrogens, the component (B), i.e. the vinyl chloride copolymer having active hydrogens and the component (C), i.e. the thermoplastic polyurethane resin, the ratio of the components (A), (B) and (C) being 30 to 90:5 to 40:5 to 40 by weight.

When only a usual vinyl chloride homopolymer or copolymer having no active hydrogens is employed as a resin ingredient in an expandable vinyl chloride resin composition for foaming under atmospheric pressure, there is not obtained a foam having a high expansion ratio as described previously. Furthermore, even when the combination of the usual vinyl chloride homopolymer or copolymer having no active hydrogens with a vinyl chloride copolymer having active hydrogens alone or a thermoplastic polyurethane resin alone is employed as a resin ingredient, the expansion ratio and the cell structure are slightly improved but a marked improvement can not be expected.

However, when a resin mixture composed of a usual vinyl chloride homopolymer or copolymer having no active hydrogens, a vinyl chloride copolymer having active hydrogens and a thermoplastic polyurethane resin in the above specific ratio is employed as a resin ingredient as in the present invention, the crosslinking of the resin mixture with the crosslinking agent mentioned below takes place to such a proper extent that the resin mixture is expanded by the gas generated by the decomposition of a foaming agent to give a foam having a high expansion ratio, and the resulting foam has an excellent rubber-like elasticity due to the proper degree of the crosslinking and the presence of the units of the thermoplastic polyurethane.

In the present invention, the components (A), (B) and (C) are employed in a ratio of 30 to 90:5 to 40:5 to 40 by weight and the expandable vinyl chloride resin composition employing such a specific mixture as a resin ingredient in accordance with the present invention gives a foam having cells in uniform size and an excellent rubber-like elasticity even though the foam is of a high expansion ratio. When the ratio of the component (A) is more than the above range, the cells of the resulting foam are coarse as the expansion ratio is higher, so that a foam having uniform cells and an excellent rubber-like elasticity cannot be obtained when the expansion ratio is not less than 10. When the ratio of the component (A) is less than the above range, the expansion ratio of the resulting foam is low and the economy is poor. When the ratio of the component (B) is more than the above range, the degree of the crosslinking is excess so that the foaming is hindered and therefore a foam of a high expansion ratio is not obtained. When the ratio of the component (B) is less than the above range, the degree of the crosslinking is insufficient so that the rubber-like elasticity of the resulting foam is poor. When the ratio of the component (C) is more than the above range, the compatibility to the vinyl chloride resins is poor and the economical efficiency is low. When the ratio of the component (C) is less than the above range, the rubber-like elasticity of the resulting foam is not improved.

In the present invention, a resin ingredient in which the ratio of the components (A), (B) and (C) is 50 to 80:10 to 30:10 to 30 is particularly suitably employed from viewpoints of the high expansion ratio and the excellent rubber-like elasticity of the resulting foam.

The crosslinking agent employed in the present invention is a compound having two or more functional groups capable of reacting the vinyl chloride copolymer having active hydrogens and the thermoplastic polyurethane resin. Examples of the crosslinking agent include compounds having two or more functional groups such as isocyanate group, latent isocyanate group, carboxyl group, hydroxyl group, epoxy group, (alkoxyalkyl)amino group, (hydroxyalkyl) amino group, amino group, alkylamino group and dialkylamino group, and dibasic acid anhydrides. Typical examples of the crosslinking agent are tolylene diisocyanate; diphenylmethanediisocyanate; polymethylene polyphenyl isocyanate; initial addition polymers having isocyanate groups at the terminal ends of their molecules which are obtained by reacting the foregoing polyisocyanate with a compound having two or more active hydrogens such as trimethylolpropane, pentaerythritol, glycerin, polyethylene glycol, polytetramethylene glycol or polyethylene adipate; latent isocyanates obtained by masking the isocyanate groups of the foregoing polyisocyanate or initial addition polymer with a masking agent such as phenol, diethyl malonate, acetoacetic acid ester, acetoxime or acid sodium sulfite; succinic acid; glutaric acid; adipic acid; phthalic acid; phthalic anhydride; cyclohexanedicarboxylic anhydride; triglycidyl isocyanurate; epoxy resin; triethylene tetramine; methylolmelamine; and butoxymethylmelamine. Among those crosslinking agents, the latent isocyanates are preferred.

The amount of the crosslinking agent employed varies depending upon the kind of the crosslinking agent and the formulation of the resin ingredient. However, the amount of the crosslinking agent usually ranges from 0.1 to 20 parts (parts by weight, the same hereinafter), particularly 0.5 to 10 parts per 100 parts of the resin ingredient. When the amount of the crosslinking agent is more than 20 parts, the crosslinking is apt to take place ahead the foaming so that the foaming is hindered and a foam of a high expansion ratio is not obtained. When the amount of the crosslinking agent is less than 0.1 part, the crosslinking is insufficient so that the cells become coarse even in a low expansion ratio and a sufficient rubber-like elasticity is not obtained.

As the foaming agent employed in the present invention, there can be employed usual chemical foaming agents with no particular limitation. Examples of the foaming agent are azodicarbonamide, p,p'-oxybis(benzenesulfonyl hydrazide), p-toluenesulfonyl hydrazide and benzenesulfonyl hydrazide. Azodicarbonamide is particularly suitable. The amount of the foaming agent employed is usually from 5 to 15 parts, particularly from 8 to 12 parts per 100 parts of the resin ingredient, whereby yielding a highly expanded foam having uniform cells and a rubber-like elasticity. When the amount of the foaming agent is more than 15 parts, the size of cells tends to become ununiform since the amount of the gas generated by the thermal decomposition of the foaming agent is excess. When the amount of the foaming agent is less than 5 parts, the amount of the gas is insufficient to obtain a foam of a high expansion ratio.

Examples of the thermal stabilizer employed in the present invention include compounds of metals such as lead, zinc, cadmium, barium, sodium, potassium, calcium, lithium and tin; mixtures of the foregoing metal compounds; and organic stabilizers such as epoxy compounds. Usually the amount of the stabilizer ranges from 1 to 5 parts, particularly 2 to 3 parts per 100 parts of the resin ingredient. When the amount of the stabilizer is less than 1 part, the vinyl chloride polymers [the components (A) and (B)] tend to be subjected to thermal degradation. When the amount of the stabilizer is more than 5 parts, the economical efficiency is low.

One of the characteristics of the present invention is that the crosslinking and foaming of the expandable composition are not influenced by the kind of the stabilizer employed. In the case of a conventional expandable composition employing predominantly a vinyl chloride copolymer having active hydrogens as a resin ingredient, Ba-Zn type complex stabilizer must be selectively employed. According to the present invention, however, there can be employed not only Ba-Zn type complex stabilizer but also other stabilizers including Ca-Zn, Na-Zn, K-Zn, Li-Ba-Zn and Li-Ca-Ba type complex stabilizers, and therefore a foam of a high expansion ratio can be prepared under wide production conditions. In this regard, the present invention is industrially suitable.

Examples of the plasticizer employed in the present invention include phthalic acid diesters such as dioctyl phthalate, dibutyl phthalate and dinonyl phthalate; dibasic fatty acid diesters such as dioctyl adipate and dioctyl sebacate; phosphoric acid triesters such as tricresyl phosphate and trioctyl phosphate; epoxy derivative plasticizers such as epoxidated soybean oil; and polyester-type plasticizers such as polyethylene adipate. The plasticizer is usually employed in an amount of 40 to 120 parts, particularly 50 to 90 parts per 100 parts of the resin ingredient. When the amount of the plasticizer departs from the above range, the rubber-like elasticity of the resulting foam is lowered, even though the foam is of a high expansion ratio and has uniform cells.

Into the composition of the present invention, there may be incorporated other additives such as coloring agents including organic dyes, organic pigments and inorganic pigments in addition to the above-mentioned resin ingredient, crosslinking agent, foaming agent, thermal stabilizer and plasticizer.

The composition of the present invention is prepared by blending the above-mentioned resin mixture, crosslinking agent, foaming agent, thermal stabilizer and plasticizer, and if necessary, other additives by means of a ribbon blender, a kneader, a Henschel mixer, a mixing mill or a Banbury mixer. The obtained composition is formed into a preform such as sheet at a temperature of less than the decomposition temperature of the foaming agent employed by means of a calender or an extruder. The preform is heated, for instance, at a temperature of 180° to 250° C. for 30 seconds to 4 minutes under an atmospheric pressure to decompose the foaming agent, yielding a foam.

As described above, the expandable vinyl chloride composition of the present invention gives, with ease and reliability, a foam of a high expansion ratio, the cells of which are uniform and fine even in an expansion ratio of not less than 10 and which has an excellent rubber-like elasticity without any compression set, with completely settling the problems of the conventional expandable vinyl chloride resin compositions for forming under normal pressure. The foams obtained from the composition of the present invention are suitable in uses such as cushions, buffers and floats due to the excellent rubber-like elasticity. Moreover the foams obtained from the composition of the present invention have good low temperature resistance, oil resistance and abrasion resistance due to the presence of the polyurethane units, as compared with usual vinyl chloride resin foams. Therefore, the present invention is markedly useful in industrial aspect.

The present invention is more specifically described and explained by means of the following Examples. These Examples are intended only to illustrate the present invention and are not to be construed to limit the scope of the invention.

EXAMPLE 1 and COMPARATIVE EXAMPLES 1 to 3

The components shown in Table 1 were blended at 150° C. for 10 minutes and formed into an expandable sheet of 1.0 mm. in thickness by means of two rollers of 10 inches in diameter. The sheet was expanded by heating it at 220° C. for 2 minutes in an oven.

With respect to the resulting foamed sheet, the expansion ratio, the status of cells, the compressive hardness and the compressive elasticity were determined in the following manners. The results thereof are shown in Table 1.

(1) Expansion ratio $$\text{Expansion ratio} = \frac{\text{The thickness of the sheet after foaming}}{\text{The thickness of the sheet before foaming}}$$

(2) Status of cells

○—The size of the cells was not more than 0.3 mm. and uniform.

△—A part of the cells were disintegrated.

X—The cells were considerably coarse and the size of the cells was ununiform, and there were voids of not less than 3 mm. in diameter.

(3) Compressive hardness

The compressive hardness was determined according to ASTM D 1565. That is, a foam having a thickness of not less than 6.5 mm. was compressed by 25% with respect to the thickness at a compression speed of 15 mm./min. and was allowed to stand for 60 seconds as it was. The stress of the foam at that time was calculated. The test was repeated three times.

(4) Compressive elasticity

The center portion of the foam was compressed by a finger by about 90% with respect to the thickness and then the finger was removed. The compressive elasticity was estimated by observing the deformation remaining in the foam after the removal of the finger.

○—The foam returned to the original shape immediately after the finger was removed and there was remained no trace of the finger.

△—There was remained some trace of the finger after the finger was removed and the trace disappeared after three minutes from the removal of the finger.

X—There was remained some trace of the finger after the finger was removed and the trace did not disappear even after three minutes from the removal of the finger.

TABLE 1

|  | Ex. 1 | Com. Ex. 1 | Com. Ex. 2 | Com. Ex. 3 |
|---|---|---|---|---|
| Composition (parts) |  |  |  |  |
| Component (A) (Note 1) | 60 | 100 | 80 | 80 |
| Component (B) (Note 2) | 20 | — | 20 | — |
| Component (C) (Note 3) | 20 | — | — | 20 |
| Plasticizer (dioctyl phthalate) | 70 | 70 | 70 | 70 |
| Thermal stabilizer (Note 4) | 3 | 3 | 3 | 3 |
| Foaming agent (azodicarbonamide) | 8 | 8 | 8 | 8 |
| Crosslinking agent (Note 5) | 0.5 | — | 0.5 | 0.5 |
| Foam |  |  |  |  |
| Expansion ratio | 11.0 | 8.5 | 8.7 | 8.7 |
| Status of cells | ○ | X | X | △ |
| Compressive hardness (kg./cm.$^2$) | 0.442 | 0.206 | 0.197 | 0.166 |

TABLE 1-continued

|  | Ex. 1 | Com. Ex. 1 | Com. Ex. 2 | Com. Ex. 3 |
|---|---|---|---|---|
| Compressive elasticity | O | X | X | X |

(Note 1):
Vinyl chloride homopolymer (prepared by suspension polymerization, average degree of polymerization: 1,300)
(Note 2):
Vinyl chloride-hydroxyethyl acrylate copolymer (prepared by emulsion polymerization, average degree of polymerization: 1,300, the content of hydroxyethyl acrylate: 3% by mole)
(Note 3):
Polyester-type thermoplastic polyurethane (average molecular weight: about 30,000, Vicat softening point: 110° C.)
(Note 4):
Ba—Zn type
(Note 5):
Adduct of trimethylolpropane and tolylene diisocyanate which was masked with phenol Table 1 reveals that the composition of the present invention (Example 1) gave a foam of a high expansion ratio of more than 10 which had uniform and fine cells, and an excellent rubber-like elasticity, as compared with the composition employing a usual vinyl chloride polymer having no active hydrogens alone as a resin ingredient (Comparative Example 1), the composition employing the usual vinyl chloride polymer and a vinyl chloride copolymer having active hydrogens as a resin ingredient (Comparative Example 2) and the composition employing the usual vinyl chloride polymer and a thermoplastic polyurethane as a resin ingredient (Comparative Example 3).

EXAMPLES 2 to 3 and COMPARATIVE EXAMPLES 4 to 7

The components shown in Table 2 were blended by means of two rollers of 10 inches in diameter under the conditions shown in Table 2 and formed into an expandable sheet of 1.0 mm. in thickness. The sheet was expanded by heating it at 220° C. for 2 minutes in an oven.

With respect to the resulting foamed sheet, the physical properties were determined in the same manner as in Example 1. The results thereof are shown in Table 2.

TABLE 2

|  | Ex. 2 | Ex. 3 | Com. Ex. 4 | Com. Ex. 5 | Com. Ex. 6 | Com. Ex. 7 |
|---|---|---|---|---|---|---|
| Composition (parts) |  |  |  |  |  |  |
| Component (A) (Note 6) | 60 | 60 | 100 | 100 | 80 | 80 |
| Component (B) (Note 7) | 20 | 20 | — | — | 20 | 20 |
| Component (C) (Note 8) | 20 | 20 | — | — | — | — |
| Plasticizer (dioctyl phthalate) | 70 | 70 | 70 | 70 | 70 | 70 |
| Thermal stabilizer (Note 9) | 3 | 3 | 3 | 3 | 3 | 3 |
| Foaming agent (azodicarbonamide) | 8 | 8 | 8 | 8 | 8 | 8 |
| Crosslinking agent (Note 10) | 0.5 | 0.5 | — | — | 0.5 | 0.5 |
| Blending condition |  |  |  |  |  |  |
| Temperature (°C.) | 140 | 150 | 140 | 150 | 140 | 150 |
| Time of period (min.) | 5 | 20 | 5 | 20 | 5 | 20 |
| Foam |  |  |  |  |  |  |
| Expansion ratio | 12.0 | 11.5 | 8.6 | 8.2 | 9.5 | 3.5 |
| Status of cells | O | O | X | X | X | X |
| Compression hardness (kg./cm$^2$) | 0.439 | 0.461 | 0.200 | 0.188 | 0.215 | (Note 11) |
| Compressive elasticity | O | O | X | X | X | (Note 11) |

(Note 6):
The same as in Note 1
(Note 7):
Vinyl chloride-monobutyl fumarate copolymer (prepared by emulsion polymerization, average degree of polymerization: 1,300, the content of monobutyl fumarate: 3% by mole)
(Note 8):
The same as in Note 3
(Note 9):
K—Zn type
(Note 10):
The same as in Note 5
(Note 11):
Not estimated due to the low expansion ratio Table 2 reveals that the compositions of Examples 2 to 3 gave foams of a high expansion ratio of more than 10 which had uniform and fine cells and an excellent rubber-like elasticity, as compared with the compositions of Comparative Examples 4 to 7. Table 2 also reveals that the compositions of Examples 2 to 3 gave foams having a high expansion ratio and an excellent rubber-like elasticity even though the compositions were blended either at a low temperature or at a high temperature. Therefore, according to the present invention, wide production conditions can be adopted for the preparation of foams, and the present invention is markedly favorable in industrial aspect.

EXAMPLES 4 to 7 and COMPARATIVE EXAMPLE 8

The components shown in Table 3 were blended and formed into an expandable sheet and the sheet was expanded in the same manner as in Example 1.

With respect to the resulting foamed sheet, the physical properties were determined in the same manner as in Example 1. The results thereof are shown in Table 3.

TABLE 3

|  | Ex. 4 | Ex. 5 | Ex. 6 | Ex. 7 | Com. Ex. 8 |
|---|---|---|---|---|---|
| Composition (parts) |  |  |  |  |  |
| Component (A) (Note 12) | 90 | 80 | 60 | 30 | 100 |
| Component (B) (Note 13) | 5 | 10 | 20 | 40 | — |
| Component (C) (Note 14) | 5 | 10 | 20 | 40 | — |
| Plasticizer (dioctyl phthalate) | 70 | 70 | 70 | 70 | 70 |
| Thermal stabilizer (Note 15) | 3 | 3 | 3 | 3 | 3 |
| Foaming agent (azodicarbonamide) | 8 | 8 | 8 | 8 | 8 |

TABLE 3-continued

|  | Ex. 4 | Ex. 5 | Ex. 6 | Ex. 7 | Com. Ex. 8 |
|---|---|---|---|---|---|
| Crosslinking agent (Note 16) | 0.5 | 0.5 | 0.5 | 0.5 | — |
| Foam |  |  |  |  |  |
| Expansion ratio | 11.4 | 12.0 | 11.8 | 9.9 | 8.5 |
| Status of cells | O | O | O | O | X |
| Compression hardness (kg./cm$^2$) | 0.335 | 0.376 | 0.458 | 0.447 | 0.210 |
| Compressive elasticity | Δ | O | O | O | X |

(Note 12):
Vinyl chloride-vinyl acetate copolymer (prepared by suspension polymerization, average degree of polymerization: 800, the content of vinyl acetate: 3.5% by mole)
(Note 13):
Partially hydrolyzed copolymer of vinyl chloride and vinyl acetate (average degree of polymerization: 700, the content of vinyl acetate: 5% by mole, the degree of hydrolysis: 75% by mole)
(Note 14):
The same as in Note 3
(Note 15):
The same as in Note 4
(Note 16):
The same as in Note 5

Table 3 reveals that the compositions of Examples 4 to 7 gave foams of a high expansion ratio not less than about 10 which had uniform and fine cells and an excellent rubber-like elasticity, as compared with the composition of Comparative Example 8. The foam obtained in Example 6 is particularly suitable from view-points of the expansion ratio and the elasticity.

What is claimed is:

1. An expandable vinyl chloride resin composition for foaming under atmospheric pressure which comprises a resin ingredient comprising (A) a vinyl chloride homopolymer or copolymer having substantially no active hydrogens, (B) a vinyl chloride copolymer having active hydrogens and (C) a thermoplastic polyurethane resin, and a crosslinking agent, a foaming agent, a thermal stabilizer and a plasticizer, the ratio of the components (A), (B) and (C) being 30 to 90:5 to 40:5 to 40 by weight.

2. The composition of claim 1, in which the component (B) is at least one of a vinyl chloride copolymer having hydroxyl groups and a vinyl chloride copolymer having carboxyl groups.

3. The composition of claim 1, in which the component (C) is a linear polyurethane having active hydrogens.

4. The composition of claim 3, in which the linear polyurethane is a reaction product of a difunctional polyol and a diisocyanate and having hydroxyl groups at the terminal ends of the molecule.

5. The composition of claim 1, in which the crosslinking agent is a compound having at least two functional groups capable of reacting with the active hydrogen.

* * * * *